(12) United States Patent
Siberdt et al.

(10) Patent No.: US 6,495,640 B1
(45) Date of Patent: Dec. 17, 2002

(54) PROCESS FOR POLYMERIZING ALPHA-OLEFINS

(75) Inventors: Fabian Siberdt, Brussels (BE); Philippe Francois, Court-Saint-Etienne (BE); Stéphane Paye, Leuze (BE)

(73) Assignee: Solvay Polyolefins Europe-Belgium(Societe Anonyme), Brussels (BE)

( * ) Notice: Subject to any disclaimer, the term of this patent is extended or adjusted under 35 U.S.C. 154(b) by 0 days.

(21) Appl. No.: 09/523,515

(22) Filed: Mar. 10, 2000

(30) Foreign Application Priority Data

Mar. 24, 1999 (BE) .......................................... 09900207

(51) Int. Cl.$^7$ .................................................. C08F 4/64
(52) U.S. Cl. ...................... 526/160; 526/163; 526/165; 526/352; 526/943; 526/132; 526/133; 502/132
(58) Field of Search ................................ 526/132, 133, 526/160, 163, 165, 352, 943

(56) References Cited

U.S. PATENT DOCUMENTS

| 5,556,893 A | 9/1996 | Costa et al. |
| 5,756,613 A | 5/1998 | Costa et al. |

FOREIGN PATENT DOCUMENTS

| EP | 0 206 794 A | 12/1986 |
| EP | 0 314 797 A | 5/1989 |
| EP | 0523879 | 8/1995 |
| JP | 10 036423 | 2/1998 |
| WO | WO 95/10546 | 4/1995 |
| WO | WO 98/03558 | 1/1998 |

OTHER PUBLICATIONS

F. Martens et al., Plaste und Kautschuk, 20 (4), pp. 278–279 (1973).
Horito Nishida et al., "Polystyrene–supported Metallocene Catalysts for Olefin Polymerizations," Macromol. Rapid Commun. 16, pp. 821–830 (1995).
Stephen B. Roscoe et al., "Functionalized Polystyrene as a Versatile Support for Olefin Polymerization Catalysts," Journal of Polymer Science: Part A: Polymer Chemistry, vol. 38, pp. 2979–2992 (2000).

*Primary Examiner*—Caixia Lu
(74) *Attorney, Agent, or Firm*—Venable; Marina V. Schneller

(57) ABSTRACT

Process for polymerizing alpha-olefins, in which at least one alpha-olefin is placed in contact, under polymerizing conditions, with a catalytic system comprising (a) a solid catalyst comprising (i) a compound of a transition metal from groups 4 to 6 of the Periodic Table, containing at least one cyclopentadiene ligand which may be substituted, (ii) an activator chosen from aluminoxanes and ionizing agents, and (iii) a porous polymeric support, and (b) at least one organoaluminium compound corresponding to the general formula $R_{3-n}Al(Y')_n$ in which $0.9 < n \leq 3$; $Y'$ represents a group chosen from —OR', —SR' and —NR'R"; R and R' independently represent an alkyl group comprising from 1 to 20 carbon atoms, an aryl, alkylaryl or arylalkyl group comprising from 6 to 30 carbon atoms, and R" represents a hydrogen atom, an alkyl group comprising from 1 to 20 carbon atoms or an aryl, alkylaryl or arylalkyl group comprising from 6 to 30 carbon atoms.

18 Claims, No Drawings

PROCESS FOR POLYMERIZING ALPHA-OLEFINS

The present invention relates to a process for polymerizing alpha-olefins.

It is known practice to polymerize alpha-olefins using solid catalysts comprising a transition metal compound containing one or more cyclopentadienyl ligands, an aluminoxane and a support. Patent application EP-A-0 206 794 describes a process for polymerizing ethylene, in which a solid catalyst of this kind is used together with methylaluminoxane or triethylaluminium, which are added to the polymerization medium to capture poisons therein, such as oxygen and water. Such a process leads to the manufacture, in relatively low catalytic yields, of polyethylenes with a low bulk density (BD), which has a negative impact on the production efficiency of the polymerization plants.

Patent application EP-A-314 797 describes a process for polymerizing ethylene using a supported catalyst based on a compound containing cyclopentadiene ligands, an aluminoxane and a dialkylaluminium alkoxide. Such a process leads to the manufacture, in relatively low catalytic yields, of resins containing a large amount of fines.

A polymerization process has now been found which does not have the abovementioned drawbacks and which gives higher catalytic yields of α-olefin polymers with a bulk density which is markedly higher than that obtained in the known processes.

To this end, the present invention relates to a process for polymerizing alpha-olefins, in which at least one alpha-olefin is placed in contact, under polymerizing conditions, with a catalytic system comprising (a) a solid catalyst comprising (i) a compound of a transition metal from groups 4 to 6 of the Periodic Table, containing at least one cyclopentadiene ligand which may be substituted, (ii) an activator chosen from aluminoxanes and ionizing agents, and (iii) a porous polymeric support with an intraparticulate pore volume, generated by pores with a radius of from 1000 to 75,000 Å, of at least 0.2 cm$^3$/g, and (b) at least one organoaluminium compound corresponding to the general formula $R_{3-n}Al(Y')_n$ in which $0.9 < n \leq 3$; Y' represents a group chosen from —OR', —SR' and —NR'R''; R and R' independently represent an alkyl group comprising from 1 to 20 carbon atoms, an aryl, alkylaryl or arylalkyl group comprising from 6 to 30 carbon atoms, and R'' represents a hydrogen atom, an alkyl group comprising from 1 to 20 carbon atoms or an aryl, alkylaryl or arylalkyl group comprising from 6 to 30 carbon atoms.

According to the present invention, the term "alpha-olefin" means olefins with terminal unsaturation containing from 2 to 20 carbon atoms, preferably from 2 to 8 carbon atoms, such as, more particularly, ethylene, propylene, 1-butene, 1-pentene, 1-hexene and 1-octene.

The solid catalyst (a) used in the process according to the present invention comprises the transition metal compound (i) and the activator (ii) on the support (iii). It goes without saying that compounds other than compounds (i) and (ii) can be supported on the support (iii). Similarly, several compounds (i) and/or (ii) can be supported on the same support.

The transition metal compound (i) which can be used according to the present invention is usually chosen from the compounds of formulae

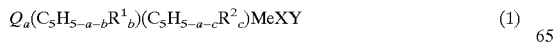 (1)

and

 (2)

in which

Q represents a divalent linking group between the two cyclopentadiene ligands $(C_5H_{5-a-b}R^1_b)$ and $(C_5H_{5-a-c}R^2_c)$, Q' represents a divalent linking group between the cyclopentadiene ligand $(C_5H_{5-a-d}R^3_d)$ and the group Z, a is 0 or 1, b, c and d are integers which satisfy the conditions $0 \leq b \leq 5$, $0 \leq c \leq 5$ and $0 \leq d \leq 5$ when a is 0 and $0 \leq b \leq 4$, $0 \leq c \leq 4$ and $0 \leq d \leq 4$ when a is 1, $R^1$, $R^2$ and $R^3$ each represent hydrocarbon-based groups containing from 1 to 20 carbon atoms, which can be linked to the cyclopentadiene ring in the form of a monovalent group, or which can be linked to each other so as to form a ring adjacent to the cyclopentadiene ring, halogen atoms, alkoxy groups containing from 1 to 12 carbon atoms, hydrocarbon-based groups containing silicon, of formula —Si($R^4$)($R^5$)($R^6$), phosphorus-containing hydrocarbon-based groups of formula —P($R^4$)($R^5$), nitrogen-containing hydrocarbon-based groups of formula —N($R^4$)($R^5$) or boron-containing hydrocarbon-based groups of formula —B($R^4$)($R^5$) in which $R^4$, $R^5$ and $R^6$ represent hydrocarbon-based groups containing from I to 24 carbon atoms, provided that when b, c or d is 2 or more and/or when there is a plurality of groups $R^1$, $R^2$ or $R^3$, these groups may be identical or different, Me represents a transition metal from groups 4 to 6 of the Periodic Table, Z represents an oxygen atom, a sulphur atom, an alkoxy group or thioalkoxy group containing from 1 to 20 carbon atoms, a nitrogen-containing or phosphorus-containing hydrocarbon-based group containing from 1 to 40 carbon atoms or a hydrocarbon-based group containing from 1 to 20 carbon atoms, provided that one bond of the group Z is linked to the group Q' when a is 1, and X and Y, which may be identical or different, each represent a hydrogen atom, a halogen atom, a hydrocarbon-based group, an alkoxy group, an amino group, a phosphorus-containing hydrocarbon-based group or a silicon-containing hydrocarbon-based group containing from 1 to 20 carbon atoms.

The preferred compounds (i) of fon-nula (1) are generally such that

Q represents an alkylene group containing 1 or 2 carbon atoms which can be substituted with alkyl or aryl groups containing from 1 to 10 carbon atoms, or a dialkylgermnanium or dialkylsilicon group containing from 1 to 6 carbon atoms, a is 0 or 1, b, c and d are integers which satisfyr the conditions $0 \leq b \leq 5$, $0 \leq c \leq 5$ and $0 \leq d \leq 5$ when a is 0 and $0 \leq b \leq 4$, $0 \leq c \leq 4$ and $0 \leq d \leq 4$ when a is 1, $R^1$ and $R^2$ represent alkyl, alkenyl, aryl, alkylaryl, alkenylaryl or arylalkyl groups containing from 1 to 20 carbon atoms, several groups $R^1$ and/or several groups $R^2$ possibly being linked to each other so as to form a ring containing from 4 to 8 carbon atoms, Me is zirconium, hafiiium or titanium, X and Y represent halogen atoms or hydrocarbon-based groups chosen from alkyls, aryls and alkenyls containing from 1 to 10 carbon atoms.

The compounds which are particularly preferred are those of formula (1) in which Q is a linking group chosen from dimethylsilyl and diphenylsilyl, ethylene and methylenes and ethylenes substituted with alkyl or aryl groups containing from 1 to 8 carbon atoms. Compounds of formula (1) which are particularly suitable are the compounds in which the ligands $(C_5H_{5-a-b}R^1_b)$ and $(C_5H_{5-a-c}R^2_c)$ are chosen from cyclopentadienyls, indenyls and fluorenyls which may be substituted.

The preferred compounds (i) of formula (2) are usually such that a is 1,

Q' represents an alkylene linking group containing 1 or 2 carbon atoms which may be substituted with alkyl or aryl groups containing from 1 to 10 carbon atoms, or a dialkylgermanium or dialkylsilicon group containing from 1 to 6 carbon atoms, $R^3$ represents an alkyl, alkenyl, aryl, alkylaryl, alkenylaryl or arylalkyl group containing from 1 to 20 carbon atoms, two groups $R^3$ possibly being linked to each other to form a ring containing from 4 to 8 carbon atoms, Me is zirconium, hafriium or titanium, X and Y represent halogen atoms or hydrocarbon-based groups chosen from alkyls, aryls, and alkenyls.

Compounds (i) of formula (2) which give good results are the compounds in which the ligand $(C_5H_{5-a-d}R^3_d)$ is a cyclopentadienyl, indenyl or fluorenyl which may be substituted and Z is an amino group.

Preferred compounds (i) according to the present invention are the compounds of formula (1).

The activator (ii) is chosen from aluminoxanes and ionizing agents. The term "aluminoxanes" means compounds corresponding to the formulae $R^7$—$(AlR^7$—$O)_m$—$AlR^7_2$ and $(—AlR^7$—$O—)_{m+2}$ in which m is a number from 1 to 40 and $R^7$ is an alkyl or aryl group containing from 1 to 12 carbon atoms. The preferred compounds are chosen from methyl-, ethyl- and isobutylaluminoxanes and mixtures thereof, and more particularly those in which m is a number from 2 to 20. The compound most particularly preferred is the methylaluminoxane in which m is a number from 10 to 18.

The expression "ionizing agents" is intended to denote compounds comprising a first portion which has the properties of a Lewis acid and which is capable of ionizing a transition metal compound (i), and a second portion which is inert with respect to the ionized transition metal compound (i) and which is capable of stabilizing it. Such compounds which may be mentioned are triphenylcarbenium tetrakis(pentafluorophenyl)borate, N,N-dimethylanilinium tetrakis(pentafluorophenyl)borate, tri(n-butyl)ammonium tetrakis(pentafluorophenyl)borate, tris (pentafluorophenyl)boron, triphenylboron, rimethylboron, tris(trimethylsilyl)boron and organoboroxines.

The preferred activators (ii) according to the present invention are aluminoxanes.

The porous polymeric support (iii) can consist of any known polymer which can support the compound (i) and the activator (ii). Non-limiting examples of such polymers which may be mentioned are homo- and copolymers of olefins, of styrenes, of divinylbenzenes and of vinyl chlorides. The support (iii) is preferably a polyolefin support. The term "polyolefins" means polymers derived from the alpha-olefins defined above or copolymers of these alpha-olefins with each other or with diolefins comprising from 4 to 18 carbon atoms. Preferred supports according to the present invention are homo- or copolymers of ethylene and of propylene.

The polymer particles which can be used as porous polymeric supports (iii) usually have a mean diameter (Ds) of from 5 to 500 $\mu$m. Preferably, the mean diameter is greater than or equal to 15 $\mu$m and more particularly greater than or equal to 40 $\mu$m. Particles with a mean diameter of less than or equal to 200 $\mu$m and more particulary less than or equal to 150 $\mu$m give good results.

The polymer particles used as porous polymeric support (iii) have an intraparticulate pore volume, generated by pores with a radius of from 1000 to 75,000 Å ($10^{-10}$ m) of at least 0.2 cm$^3$/g. In the context of the present invention, the expression "intraparticulate pore volume" is intended to denote the pore volume generated, in the region from 1000 to 75,000 Å, by the internal porosity of the particles, excluding the pore volume generated by the porosity between the particles (the interparticulate pore volume). The intraparticulate pore volume generated by pores with a radius of from 1000 to 75,000 Å can be determined by measuring the total pore volume of the support in the region 1000 to 75,000 Å, followed by subtracting the interparticulate pore volume therefrom. The interparticulate pore volume depends on the mean diameter Ds of the particles (F. Martens & H. Behrens, Plaste und Kautschuk, vol. 20(4), 1973, pages 278–279). The interparticulate pore volume is defined, in the context of the present invention, as being the pore volume generated in the region between $$\frac{Ds}{13}$$

and 75,000 Å.

The support (iii) preferably has an intraparticulate pore volume of at least 0.3 cm$^3$/g. Supports (iii) which are particularly preferred are those with an intraparticulate volume of at least 0.5 cm$^3$/g. The intraparticulate pore volume generally does not exceed 1.5 cm$^3$/g.

The supports (iii) preferably used according to the present invention are those consisting of porous polyolefin particles, and more particularly those with a mean diameter and a pore volume as described above. Such supports are described in particular in patent U.S. Pat. No. 5,556,893 (Solvay). These supports have the advantage of having the desired morphology without them needing to undergo subsequent treatment (s). They have both a very high porosity and very high mechanical abrasion strength, allowing them to be used without them losing their morphology. In addition, the use of supports which are compatible with the polymer leads ultimately to polymers with a particularly low ash content.

The solid catalyst (a) used in the process according to the invention can be obtained by various methods. In general, the support particles (iii) are placed in contact with a solution containing the activator (ii) to give a suspension, which is then evaporated. The solution containing the activator (ii) is generally prepared from liquid aliphatic or cycloaliphatic hydrocarbons which are possibly halogenated, or from liquid aromatic hydrocarbons. Preferred examples of these solvents which may be mentioned are benzene, toluene, xylene, hexane, heptane, octane, decalin, dichloromethane, dichloroethane, chloropropane and chlorobenzene. The transition metal compound (i) can be introduced into the suspension described above. It may also have been incorporated into the support (iii) before it is used. Finally, it can be placed in contact with the support particles comprising the activator (ii). The preferred method for preparing the solid catalyst (a) comprises the preparation of a solution containing the transition metal compound (i) and the activator (ii), to which is added the support (iii) so as to form a suspension, which is then evaporated.

The solid catalyst (a) used in the process according to the present invention generally contains from 0.0001 to 0.5 g of transition metal compound (i) per gram of support (iii). Preferably, the concentration of compound (i) is at least 0.0005 g and more particularly at least 0.001 g per gram of support (iii). Amounts of compound (i) of less than or equal to 0.3 g and preferably less than or equal to 0.1 g per gram of support give good results.

The amount of activator (ii) in the solid catalyst depends on the type of activator used. When the activator (ii) is an aluminoxane, the amount of aluminoxane is usually such that the atomic ratio between the aluminium of the aluminoxane and the transition metal of the compound (i) in the solid catalyst is from 20 to 5000. Preferably, this ratio is at least 50, more particularly at least 100. Good results are obtained when this ratio is at least 200. Usually, the aluminoxane is used in amounts such that the aluminium/transition metal atomic ratio is not more than 2000 and more particularly not more than 1500. Ratios of not more than 1000 give good results. When the activator (ii) is an ionizing agent, the amount of ionizing agent is usually such that the molar ratio between the ionizing agent and the transition metal compound (i) is from 0.05 to 50. Preferably, this ratio is at least 0.1 and more particularly not more than 20.

According to one advantageous variant of the process according to the invention, a solid catalyst (a) is used which has been subjected to a preliminary polymerization in the course of which it is placed in contact with an alpha-olefin, under polymerizing conditions so as to form from 0.01 to 50 g of polyolefin per g of solid catalyst containing the compounds (i), (ii) and (iii). The alpha-olefin used during the preliminary polymerization step is advantageously chosen from alpha-olefins containing from 2 to 4 carbon atoms. Ethylene and propylene are particularly suitable. The amount of polymer formed during the preliminary polymerization step is usually at least 0.05 and more particularly at least 0.1 g of polyolefin per g of solid catalyst containing the compounds (i), (ii) and (iii). Good results are obtained when this amount is less than or equal to 30 g, preferably not more than 10 g, per g of solid catalyst containing the compounds (i), (ii) and (iii). According to one particularly advantageous embodiment of the A invention, this preliminary polymerization is carried out in a diluent whose kinematic viscosity, measured at 20° C., is from 3 to 3000 mm$^2$/s (preferably from 10 to 500 mm$^2$/s), such as a mineral oil.

The solid catalyst (a) used in the process according to the invention is generally in the form of a free-flowing dry powder. The particles of solid catalyst generally have the same morphology as the supports from which they are derived. The solid catalyst (a) can be used without further processing for the polymerization of the alpha-olefins. The solid catalyst (a) can also be used in the process according to the invention in the form of a suspension in a diluent which is suited to its use.

The organoaluminium compound (b) used in the process according to the present invention is chosen from compounds corresponding to the general formula $R_{3-n}Al(Y')_n$ in which $0.9<n\leq3$, Y' represents a group chosen from —OR', —SR' and —NR'R"; R and R' independently represent an alkyl group comprising from 1 to 20 carbon atoms or an aryl, alkylaryl or arylalkyl group comprising from 6 to 30 carbon atoms, and R" represents a hydrogen atom, an alkyl group comprising from 1 to 20 carbon atoms or an aryl, alkylaryl or arylalkyl group comprising from 6 to 30 carbon atoms.

The preferred organoaluminium compounds (b) are those in which R and R' independently represent an alkyl group comprising from 1 to 6 carbon atoms and R" is a hydrogen atom or an alkyl group comprising from 1 to 6 carbon atoms.

Preferably, the organoaluminium compound (b) used is chosen from compounds corresponding to the general formula $R_{3-n}Al(OR')_n$ in which R and R' have the meanings given above. Compounds which are particularly preferred are those corresponding to the general formula $R_{3-n}Al(OR')_n$ in which R and R' are alkyl groups comprising from 1 to 6 carbon atoms, and more especially those in which R and R' are alkyl groups comprising from 2 to 4 carbon atoms.

The preferred organoaluminium compounds (b) are those in which $1.0<n\leq2.9$, and more particularly those in which $1.05<n\leq2.5$.

The organoaluminium compounds (b) which are particularly preferred in the process according to the invention are compounds corresponding to the general formula $R_{3-n}Al(OR')_n$ in which $1.05<n\leq2.5$ and R and R', independently, are chosen from ethyl, isopropyl, isobutyl, n-butyl and t-butyl groups.

The organoaluminium compounds (b) used in the process according to the invention can be obtained by various known methods. They can be obtained, for example, by reacting, in suitable amounts, an organoaluminium derivative of formula $R_3Al$ with an alcohol of formula H—O—R', an amine of formula H—NR'R" and/or a thioalcohol of formula H—S—R'. The organoaluminium compounds (b) used in the process according to the invention, in which n>1, are advantageously obtained by reacting a compound of formula $R_2Al$(Y') with an alcohol of formula H—O—R', an amine of formula H—NR'R" and/or a thioalcohol of formula H—S—R'; in these formulae, R' and R" have the meanings given above in relation to the organoaluminium compound (b). In this case, the amount of alcohol, amine or thioalcohol used is generally less than 2.5 mol per mole of compound of formula $R_2Al$(Y'). Preferably, the amount of alcohol, amine or thioalcohol used is less than or equal to 2 mol per mole of compound of formula $R_2Al$(Y'). An amount which is particularly preferred is one which does not exceed 1.5 mol per mole of compound of formula $R_2Al$(Y'). The amount of alcohol, amine or thioalcohol used is preferably at least equal to 0.05 mol per mole of compound of formula $R_2Al$(Y').

The organoaluminium compound (b) corresponding to the general formula $R_{3-n}Al(Y')_n$ in which $0.9<n\leq3$ can also be obtained by mixing together several organoaluminium compounds, this mixture having a composition such that it corresponds to the general formula $R_{3-n}Al(Y')_n$ in which $0.9<n\leq3$. For example, mixing one equivalent of an organoaluminium compound $R_3Al$ with one equivalent of a compound $R_{3-x}Al(Y')_x$ in which x>1.8 produces an organoaluminium compound corresponding to the general formula $R_{3-n}Al(Y')_n$ in which $0.9<n<3$.

The organoaluminium compound (b) corresponding to the general formula $R_{3-n}Al(Y')_n$ in which $0.9<n\leq3$ can be in various forms, in particular in monomeric, dimeric, trimeric, tetrameric or oligomeric form.

The amount of organoaluminium compound (b) corresponding to the general formula $R_{3-n}Al(Y')_n$ in which $0.9<n\leq3$ used in the process according to the invention is generally such that the atomic ratio between the aluminium from the organoaluminium compound (b) and the transition metal of the compound (i) is from 10 to 50,000. Preferably, this ratio is at least 50, more particularly at least 100. Good results are obtained when this ratio is at least 200. Usually, the organoaluminium compound (b) is used in amounts such that the atomic ratio:aluminium from the organoaluminium compound/transition metal of compound (i) is not more than 20,000 and more particularly not more than 17,000. Ratios of not more than 15,000 give good results.

The polymerization process according to the invention can be carried out in continuous or batchwise mode, according to any known process, in solution or in suspension in a hydrocarbon-based diluent, in suspension in the monomer, or one of the monomers, maintained in the liquid state or in the gas phase.

The temperature at which the polymerization process according to the invention is carried out is generally from −20° C. to +150° C., usually from 20 to 130° C. The polymerization temperature is preferably at least 60° C. Preferably, it does not exceed 115° C.

The total pressure at which the process according to the invention is carried out is generally chosen between atmospheric pressure and 100×10$^5$ Pa, more particularly between 10×10$^5$ and 55×10$^5$ Pa.

The molecular mass of the polymers manufactured according to the process of the invention can be adjusted by adding one or more agents for adjusting the molecular mass of the polyolefins, such as, more particularly, hydrogen.

According to one advantageous variant of the process according to the invention, the process comprises a first polymerization step, which is separate from the preliminary polymerization step (described above in relation to the solid catalyst) and referred to as the prepolymerization step, during which from 1 to 1000 g of polymer is formed per g of solid catalyst containing the compounds (i), (ii) and (iii). The amount of prepolymer formed in this prepolymerization step is advantageously at least 3 g, more particularly at least 5 g, per g of solid catalyst containing the compounds (i), (ii) and (iii). Good results are obtained when the amount of prepolymer is not more than 700 g, more particularly not more than 400 g, per g of solid catalyst containing the compounds (i), (ii) and (iii). In general, the prepolymerization step is carried out at a temperature of from 0 to 60° C., preferably at a temperature of from 20 to 50° C.

When the polymerization process is applied to the polymerization of propylene, this prepolymerization step is advantageously carried out in suspension in the liquid monomer. When the process is applied to the polymerization of ethylene, the prepolymerization is advantageously carried out in a diluent chosen from aliphatic hydrocarbons containing from 3 to 10 carbon atoms.

One advantage of processes comprising such a prepolymerization step is that the morphology of the polymer is conserved even when the subsequent polymerization step is carried out at high temperature.

The polymerization process according to the invention is advantageously applied to the manufacture of ethylene polymers, and more particularly to the manufacture of ethylene homopolymers and copolymers comprising at least 90mol% of units derived from ethylene. The preferred copolymers are those of ethylene and of another alpha-olefin comprising from 3 to 8 carbon atoms. Copolymers of ethylene and of 1-butene and/or of 1-hexene are particularly preferred. In this case, the polymerization process is preferably carried out in suspension in a hydrocarbon-based diluent. The hydrocarbon-based diluent is generally chosen from aliphatic hydrocarbons containing from 3 to 10 carbon atoms. Preferably, the diluent is chosen from propane, isobutane and hexane or mixtures thereof.

The process according to the invention is also advantageously applied to the manufacture of copolymers of ethylene and of another alpha-olefin comprising from 3 to 8 carbon atoms, with a bimodal molecular weight distribution. According to a first variant of the process according to the invention, these copolymers are manufactured in a single polymerization reactor using a catalytic system comprising at least two different transition metal compounds (i), each giving a polymer whose molecular mass is different from that of the other. According to a second variant of the process according to the invention, these polymers are manufactured by carrying out the process according to the invention in at least two polymerization reactors connected in series, the polymerization conditions being different in the two reactors. In this second variant, the polymerization process is preferably carried out so as to obtain an ethylene copolymer of high molecular mass in one of the reactors, and an ethylene homopolymer whose molecular mass is lower than that of the copolymer, in the other reactor.

The process according to the invention produces alpha-olefin polymers with a high bulk density (BD), in particular markedly higher than the polymers obtained in processes using a catalytic system not comprising an organoaluminium compound (b) according to the invention. The reason for this is that it has been observed, surprisingly, that the use of an organoaluminium compound (b) corresponding to the formula $R_{3-n}Al(Y')_n$ gives polymers whose bulk densities are higher than those obtained with the same solid catalyst but in the absence of an organoaluminium compound or in the presence of a conventional alkylaluminium such as trimethylaluminium, triethylaluminium or triisobutylaluminium. The advantage of obtaining polymers with high bulk densities is that it increases the production capacities of the polymerization plants, and the storage and transportation capacities.

In addition, it has also been demonstrated, surprisingly, that the process according to the invention gives very high catalytic activity, much higher than that obtained when a non-porous support or an inorganic support such as silica is used as support (iii) and/or when the catalytic system is used without an organoaluminium compound (b) or in the presence of a conventional alkylaluminium such as trimethylaluminium, triethylaluminium or triisobutylaluminium.

Another advantage of the process according to the invention is that there is virtually no formation of crust in the polymerization reactor.

Moreover, the use of the process according to the invention produces polymers with very good morphology and whose content of fine particles (particles with a diameter of less than or equal to 125 μm) is very low, usually less than 0.5% by weight and more particularly less than 0.1% by weight relative to the total weight of polymer. Such low fines contents are obtained even for high catalytic activities (less than 0.5 ppm of transition metal in the final polymer).

The examples which follow serve to illustrate the invention. The meaning of the symbols used in these examples, the units expresssing the magnitudes mentioned and the methods for measuring these magnitudes are explained below.

Ds=mean diameter of the support particles, in ltm. The mean diameter of the support particles is the median diameter of the particles measured, using a suspension in 2-propanol, according to standard NFX11-666 (1984) on a Malvem® Mastersizer MS1000 machine.

PVi=intraparticulate pore volume of the support, generated by pores with a radius of from 1000 to 75,000 Å ($10^{-10}$ m), expressed in cm$^3$/g. The porosity of the supports (iii) is determined by the mercury penetration method using porosimeters sold by Carlo Erba Co. in the pore radius region 75 to 75,000 Å ($10^{-10}$ m). This gives the curve of the total pore volume expressed in cm$^3$/g as a function of the pore diameter, from which the total pore volume generated by pores with radii of from 1000 to 75,000 Å ($10^{-10}$ m) is determined. The intraparticulate pore volume is obtained by subtracting the interparticulate pore volume (which is the pore volume generated by pores with a radii of between $$\frac{Ds}{13}$$

(value expressed in Å) and 75,000 Å) from this total pore volume.

α=catalytic activity, expressed in kg of polymer obtained per millimole of transition metal from the compound (i). This catalytic activity is assessed indirectly from the determination of the residual content of transition metal in the polyethylene by Inductively Coupled Plasma Mass Spectroscopy (ICP-MS) on a Micromass® Plasma Trace 1 machine.

BD=bulk density of the polymer obtained, expressed in kg/m³. The bulk density (BD) of the alpha-olefin polymer is measured by freeflow according to the following procedure: the polymer from the polymerization process is poured into a cylindrical 50 cm³ container, taking care not to pack it down, from a hopper whose bottom edge is 20 mm above the top edge of the container. The container filled with the powder is then weighed, the tare is deducted from the weight recorded and the result obtained, expressed in kg, is multiplied by 20,000, so as to express the BD in kg/m³.

EXAMPLE 1

A. Preparation of the Solid Catalyst 0.2 g of bis(n-butylpentadienyl)zirconium dichloride [compound (i)] and 50 ml of toluene are introduced successively into a preconditioned 0.8 l reactor fitted with a stirrer. 200 ml of a solution of methylaluminoxane (compound (ii)) at a concentration of 10% by weight in toluene and 40 g of a polypropylene support (compound (iii)) prepared according to the method described in Example 1 of patent U.S. Pat. No. 5,556,893 and characterized by a Ds of 64 μm and a PVi of 0.795 cm³/g, are then added dropwise with stirring. The total pore volume measured between 1000 and 75,000 Å was 0.84 cm³/g.

The interparticulate pore volume measured between 49,230

$$Å\left(=\frac{Ds}{13}\right)$$

and 75,000 Å was 0.045 cm³/g.

The suspension thus obtained is then brought to 65° C. and evaporated with stirring and under a stream of nitrogen, until a free-flowing dry powder is obtained. This evaporation step lasts about 10 hours and is considered as being complete when the concentration of solvent in the nitrogen at the reaction outlet is less than 50 ppm. At room temperature, 2.2 g of powder are taken for analytical purposes. The zirconium content of this powder, measured by X-ray fluorescence, is 0.84 g/kg. No significant increase in the mean diameter of this powder is observed.

The rest of the powder is then suspended, while flushing with nitrogen, in 518.8 g of Ondina® 32 mineral oil sold by Shell and having a kinematic viscosity of 90 cSt (mm²/s), so as to form a 9% by weight suspension.

With the reactor maintained at 25° C. under an inert atmosphere, ethylene is then introduced at a partial pressure of 1.5 kg/cm². This introduction is maintained for about 35 minutes so as to incorporate 7.44 g of ethylene and to give a solid catalyst containing 0.2 g of polyethylene per gram of solid catalyst comprising the compounds (i), (ii) and (iii).

B. Polymerization of Ethylene 1 mmol of diethylaluminium ethoxide ($(C_2H_5)_2Al(OC_2H_5)$) (sold by the company Witco under the name Dealox and used in the form of a solution at a concentration of 40 g/l in hexane) and 900 ml of isobutane are introduced, while flushing with dry nitrogen, into a pre-dried 3-litre autoclave fitted with a stirrer.

The temperature is brought to 30° C. and ethylene is introduced so as to obtain a partial pressure of ethylene of $10 \times 10^5$ Pa.

After introducing about 159 mg of the solid catalyst described above (this amount corresponds to $1.3 \times 10^6$ mol of Zr) with the aid of 100 ml of isobutane, the reactor is maintained at 30° C. for 20 minutes (prepolymerization).

Next, the reactor temperature is raised to 75° C. Throughout the polymerization, the partial pressure of ethylene is maintained at $13.8 \times 10^5$ Pa.

After polymerization for 1 hour, the excess ethylene is degassed and 162 g of polyethylene are recovered in the form of grains of uniform morphology with an BD of 346 kg/m³ and containing no particles with a diameter of less than or equal to 200 μm. The walls of the reactor show no traces of encrusting.

The catalytic activity, α, is 315 kg PE/mmol Zr.

EXAMPLE 2 R

Not in Accordance with the Invention

Example 1 is repeated, except that the organoaluminium compound $(C_2H_5)_2Al(OC_2H_5)$ is replaced with triethylaluminium. After polymerization for 1 hour, 40 g of polyethylene with an BD of 250 kg/m³ are recovered. The polyethylene includes a large amount of fine particles with a diameter of less than 125 μm.

α=65 kg PE/mmol Zr.

EXAMPLE 3

A. Preparation of the Solid Catalyst 0.39 g of dimethylsilyl-1,1'-bis(2-methyl-4,5-benzindenyl)zirconium dichloride [compound (i)] and 50 ml of toluene are introduced successively into a preconditioned 0.8 l reactor fitted with a stirrer. 300 ml of a solution of methylaluminoxane (compound (ii)) at a concentration of 10% by weight in toluene and 60 g of a polypropylene support (compound (iii)) as described in Example 1, are then added dropwise and with stirring.

The suspension thus obtained is then brought to 65° C. and evaporated, with stirring and under a stream of nitrogen, until a free-flowing dry powder is obtained. This evaporation step lasts about 10 hours and is considered as being complete when the concentration of solvent in the nitrogen at the reactor outlet is less than 50 ppm. At room temperature, 3.7 g of powder are taken for analytical purposes. The zirconium content of this powder, measured by X-ray fluorescence, is 0.86 g/kg.

The rest of the powder is then suspended, while flushing with nitrogen, in 540 g of Ondina® 32 mineral oil sold by Shell and having a kinematic viscosity of 90 cSt (mm²/s), so as to form a 13.3% by weight suspension.

With the reactor maintained at 25° C. under an inert atmosphere, propylene is then introduced therein at a partial pressure of 1.5 kg/cm². This introduction is maintained for about 35 minutes, so as to incorporate 33.2 ml of propylene and to give a solid catalyst containing 0.2 g of polypropylene per gram of solid catalyst comprising the compounds (i), (ii) and (iii).

B. Polymerization of Ethylene 0.3 mmol of diethylaluminium ethoxide $(C_2H_5)_2Al(OC_2H_5)$ (sold by the company Witco under the name Dealox and used in the form of a solution at a concentration of 40 g/l in hexane) and 900 ml of isobutane are introduced, while flushing with nitrogen, into a pre-dried 3-litre autoclave fitted with a stirrer.

The temperature is brought to 30° C. and ethylene is introduced so as to obtain a partial pressure of ethylene of $10 \times 10^5$ Pa.

After introducing about 114 mg of the solid catalyst described above (this amount corresponds to $0.5 \times 10^{-3}$ mmol of Zr) with the aid of 100 ml of isobutane, the reactor is maintained at 30° C. for 20 minutes (prepolymerization).

The reactor temperature is then raised to 75° C. Throughout the polymerization, the partial pressure of ethylene is maintained $13.8 \times 10^5$ Pa.

After 1 hour, the excess ethylene is degassed and 96 g of polyethylene are recovered in the form of grains of uniform morphology with an BD of 384 kg/m$^3$ and containing no particles with a diameter of less or equal to 200 μm. The walls of the reactor show no traces of encrusting; however, a slight film is present thereon.
α=143 kg PE/mmol Zr.

EXAMPLE 4

Example 3 is repeated, except that the organoaluminium compound of formula $(C_2H_5)_2Al(OC_2H_5)$ is replaced with an organoaluminium compound of formula $(C_2H_5)_{1.95}Al(OC_2H_5)_{1.05}$. This compound is obtained by reacting, for about 1 hour and at a temperature of 20° C., 25 ml of a solution at a concentration of 80 g/l of the organoaluminium compound of formula $(C_2H_5)_2Al(OC_2H_5)$ in hexane with 0.05 equivalent of ethanol dissolved in 25 ml of hexane.

After polymerization for 1 hour, 292 g of polyethylene are recovered in the form of grains of uniform morphology with an BD of 383 kg/m$^3$ and containing no particles with a diameter of less than or equal to 200 μm. The walls of the reactor show no traces of encrusting, or of a film.
α=380 kg PE/mmol Zr.

EXAMPLE 5

Example 3 is repeated, except that the organoaluminium compound of formula $(C_2H_5)_2Al(OC_2H_5)$ is replaced with an organoaluminium compound of formula $(C_2H_5)_{1.5}Al(OC_2H_5)_{1.5}$. This compound is obtained by reacting, for 2 hours and at a temperature of 20° C., 15 ml of a solution at a concentration of 80 g/l of the organoaluminium compound of formula $(C_2H_5)_2Al(OC_2H_5)$ in hexane with 0.5 equivalent of ethanol dissolved in 14.5 ml of hexane.

After polymerization for 1 hour, 486 g of polyethylene are recovered in the form of grains of uniform morphology with an BD of 339 kg/m$^3$ and containing no particles with a diameter of less than or equal to 200 μm. The walls of the reactor show no traces of encrusting or of a film.
α=760 kg PE/mmol Zr.

EXAMPLE 6

Example 3 is repeated, except that the organoaluminium compound of formula $(C_2H_5)_2Al(OC_2H_5)$ is replaced with an organoaluminium compound of formula $(C_2H_5)_1Al(OC_2H_5)_2$. This compound is obtained by reacting, for about 2 hours and at a temperature of 20° C., 25 ml of a solution at a concentration of 80 g/l of the organoaluminium compound of formula $(C_2H_5)_2Al(OC_2H_5)$ in hexane with 1 equivalent of ethanol dissolved in 23.9 ml of hexane.

After polymerization for 1 hour, 528 g of polyethylene are recovered in the form of grains of uniform morphology with an BD of 327 kg/m$^3$ and containing no particles with a diameter of less than or equal to 200 μm. The walls of the reactor show no traces of encrusting or of a film.
α=702 kg PE/mmol Zr.

EXAMPLE 7

Example 3 is repeated, except that the organoaluminium compound of formula $(C_2H_5)_2Al(OC_2H_5)$ is replaced with an organoaluminium compound of formula $(C_2H_5)_{0.05}Al(OC_2H_5)_{2.95}$. This compound is obtained by reacting, for about 2 hours and at a temperature of 20° C., 25 ml of a solution at a concentration of 80 g/l of the organoaluminium compound of formula $(C_2H_5)_2Al(OC_2H_5)$ in hexane with 1.95 equivalents of ethanol dissolved in 22.8 ml of hexane.

After polymerization for 1 hour, 118 g of polyethylene are recovered in the form of grains of uniform morphology with an BD of 318 kg/m$^3$ and containing no particles with a diameter of less than or equal to 200 μm. The walls of the reactor show no traces of encrusting or of a film.
α=182 kg PE/mmol Zr.

EXAMPLE 8 R

Not in Accordance with the Invention

Example 3 is repeated, except that the organoaluminium compound of formula $(C_2H_5)_2Al(OC_2H_5)$ is omitted.

After polymerization for 1 hour, 33 g of polyethylene with an BD of 168 kg/m$^3$ are recovered. The walls of the reactor show no traces of encrusting; however, a film is present thereon.
α=57 kg PE/mmol Zr.

EXAMPLE 9 R

Not in Accordance with the Invention

Example 3 is repeated, except that the 0.3 mmol of the organoaluminium compound of formula $(C_2H_5)_2Al(OC_2H_5)$ is replaced with 1 mmol of triethylaluminium.

After polymerization for 1 hour, 78 g of polyethylene with an BD of 128 kg/m$^3$ are recovered. The walls of the reactor show encrusting.
α=101 kg PE/mmol Zr.

EXAMPLE 10 R

Not in Accordance with the Invention

Example 3 is repeated, except that the 0.3 mmol of the organoaluminium compound of formula $(C_2H_5)_2Al(OC_2H_5)$ is replaced with 1 mmol of trimethylaluminium.

After polymerization for 1 hour, 58 g of polyethylene with an BD of 211 kg/m$^3$ are recovered. The walls of the reactor show encrusting.
α=76 kg PE/mmol Zr.

What is claimed is:

1. Process for polymerizing alpha-olefins, in which at least one alpha-olefin is contacted, under polymerization conditions, with a catalytic system comprising
   (a) a solid catalyst comprising (i) a compound of a transition metal selected from groups 4 to 6 of the Periodic Table, containing at least one cyclopentadiene ligand which may be substituted, (ii) an activator selected from the group consisting of aluminoxanes and ionizing agents, and (iii) a porous polymeric support with an intraparticulate pore volume of at least 0.2 cm³/g, wherein said intraparticulate pore volume is a measurement based on pores with a radius of from 1000 to 75,000 Å, and (b) at least one organoaluminum compound corresponding to the general formula $R_{3-n}Al(Y')_n$ in which $0.9<n\leq3$; Y' is selected from the group consisting of —OR', —SR', and —NR'R''; R and R' independently represent an alkyl group comprising from 1 to 20 carbon atoms, an aryl, alkylaryl or arylallkyl group comprising from 6 to 30 carbon atoms, and R'' represents a hydrogen atom, an alkyl group comprising from 1 to 20 carbon atoms or an aryl, alkylaryl or arylallkyl group comprising from 6 to 30 carbon atoms.

2. Process according to claim 1, in which the transition metal compound (i) is selected from the group consisting of compounds of formulae

  (1)

and

  (2)

in which

Q represents a divalent linking group between the two cyclopentadiene ligands $(C_5H_{5-a-b}R^1_b)$ and $(C_5H_{5-a-c}R^2_c)$, Q' represents a divalent linking group between the cyclopentadiene ligand $(C_5H_{5-a-d}R^3_d)$ and the group Z, a is 0 or 1, b, c and d are integers which satisfy the conditions $0\leq b\leq5$, $0\leq c\leq5$ and $0\leq d\leq5$ when a is 0 and $0\leq b\leq4$, $0\leq c\leq4$ and $0\leq d\leq4$ when a is 1, $R^1$, $R^2$ and $R^3$ each represent hydrocarbon-based groups containing from 1 to 20 carbon atoms, which can be linked to the cyclopentadiene ring in the form of a monovalent group, or which can be linked to each other so as to form a ring adjacent to the cyclopentadiene ring, halogen atoms, alkoxy groups containing from 1 to 12 carbon atoms, hydrocarbon-based groups containing silicon of formula —Si$(R^4)(R^5)(R^6)$, phosphorous-containing hydrocarbon-based groups of formula —P$(R^4)(R^5)$, nitrogencontaining hydrocarbon-based groups of formula —N$(R^4)(R^5)$ or boron-containing hydrocarbon-based groups of formula —B$(R^4)(R^5)$ in which $R^4$, $R^5$ and $R^6$ represent hydrocarbon-based groups containing from 1 to 24 carbon atoms, provided that when b, c or d is 2 or more and/or when there is a plurality of groups $R^1$, $R^2$ or $R^3$, these groups may be identical or different, Me represents a transition metal selected from groups 4 to 6 of the Periodic Table, Z represents an oxygen atom, a sulphur atom, an alkoxy group or thioalkoxy group containing from 1 to 20 carbon atoms, a nitrogen-containing or phosphorus-containing hydrocarbon-based group containing from 1 to 40 carbon atoms or a hydrocarbon-based group containing from 1 to 20 carbon atoms, provided that one bond of the group Z is linked to the group Q' when a is 1, and X and Y, which may be identical or different, each represent a hydrogen atom, a halogen atom, a hydrocarbon-based group, an alkoxy group, an amino group, a phosphorus-containing hydrocarbon-based group or a silicon-containing hydrocarbon-based group containing from 1 to 20 carbon atoms.

3. Process according to claim 2, in which the activator (ii) is an aluminoxane chosen from methyl-, ethyl- and isobutylaluminoxanes and mixtures thereof.

4. Process according to claim 1, in which the support has an intraparticulate pore volume, generated by radii of from 1000 to 75,000 Å, of at least 0.3 cm³/g.

5. Process according to claim 1, in which the support consists of porous polyolefin particles.

6. Process according to claim 1, in which the solid catalyst has been subjected to a preliminary polymerization.

7. Process according to claim 1, in which the organoaluminium compound is chosen from compounds corresponding to the general formula $R_{3-n}Al(OR')_n$ in which R and R' independently represent an alkyl group comprising from 1 to 20 carbon atoms or an aryl, alkylaryl or arylalkyl group comprising from 6 to 30 carbon atoms.

8. Process according to claim 1, in which the organoaluminium compound is chosen from those in which $1.05<n<2.5$.

9. Process according to claim 7, in which the organoaluminium compound corresponds to the general formula $R_{3-n}Al(OR')_n$ in which $1.05<n<2.5$ and R and R', independently, are chosen from ethyl, isopropyl, isobutyl, n-butyl and t-butyl groups.

10. Process according to claim 1, applied to the manufacture of ethylene homopolymers or copolymers comprising at least 90 mol % of units derived from ethylene.

11. Process according to claim 1, wherein the porous polymeric support comprises polypropylene.

12. Process according to claim 11, wherein the porous polymeric support is characterized by a total pore volume, generated by radii of from 1000 to 75000 Å of at least 0.3 cm³/g.

13. Process according to claim 11, wherein the activator is methylaluminoxane.

14. Process according to claim 11, wherein the compound of a transition metal compound is bis(n-butylpentadienyl)zirconium dichloride.

15. Process according to claim 11, wherein the compound of a transition metal compound is dimethylsilyl-1,1'-bis(2-methyl-4,5-benzindenyl)zirconium dichloride.

16. Process according to claim 11, wherein the organoaluminium compound is at least one selected from the group consisting of $(C_2H_5)_2Al(OC_2H_5)$, $(C_2H_5)_{1.95}Al(OC_2H_5)_{1.05}$, $(C_2H_5)_{1.5}Al(OC_2H_5)_{1.5}$, $(C_2H_5)_1Al(OC_2H_5)_2$, $(C_2H_5)_{0.05}Al(OC_2H_5)_{2.95}$.

17. Process according to claim 14, wherein the organoaluminium compound is at least one selected from the group consisting of $(C_2H_5)_2Al(OC_2H_5)$, $(C_2H_5)_{1.95}Al(OC_2H_5)_{1.05}$, $(C_2H_5)_{1.5}Al(OC_2H_5)_{1.5}$, $(C_2H_5)_1Al(OC_2H_5)_2$, $(C_2H_5)_{0.05}Al(OC_2H_5)_{2.95}$.

18. Process according to claim 15, wherein the organoaluminium compound is at least one selected from the group consisting of $(C_2H_5)_2Al(OC_2H_5)$, $(C_2H_5)_{1.95}Al(OC_2H_5)_{1.05}$, $(C_2H_5)_{1.5}Al(OC_2H_5)_{1.5}$, $(C_2H_5)_1Al(OC_2H_5)_2$, $(C_2H_5)_{0.05}Al(OC_2H_5)_{2.95}$.

* * * * *